(12) United States Patent
Rives

(10) Patent No.: US 6,801,539 B1
(45) Date of Patent: Oct. 5, 2004

(54) SERIALIZED HDSL MULTIPLEXER - DEMULTIPLEXER PROTOCOL

(75) Inventor: Eric M. Rives, Hampton Cove, AL (US)

(73) Assignee: Adtran, Inc., Huntsville, AL (US)

( * ) Notice: Subject to any disclaimer, the term of this patent is extended or adjusted under 35 U.S.C. 154(b) by 665 days.

(21) Appl. No.: 09/602,850

(22) Filed: Jun. 26, 2000

(51) Int. Cl.[7] .............................. H04J 3/16; H04J 3/22
(52) U.S. Cl. ...................... 370/466; 370/430; 370/535
(58) Field of Search ............................... 370/503, 507, 370/509, 522, 528, 529, 535, 536, 537, 538, 540, 542, 543, 544, 430, 466

(56) References Cited

U.S. PATENT DOCUMENTS

| | | | | |
|---|---|---|---|---|
| 4,616,361 A | * | 10/1986 | Strehl et al. ............. | 370/110.1 |
| 5,263,028 A | | 11/1993 | Borgnis et al. ........... | 370/105.1 |
| 5,452,306 A | | 9/1995 | Turudic et al. ........... | 370/110.1 |
| 5,541,931 A | * | 7/1996 | Lee et al. .................... | 370/112 |
| 5,771,229 A | * | 6/1998 | Garvilovich ................ | 370/342 |
| 5,909,445 A | * | 6/1999 | Schneider ................... | 370/468 |
| 6,157,659 A | * | 12/2000 | Bird ............................. | 370/538 |
| 6,240,274 B1 | * | 5/2001 | Izadpanah ................... | 455/39 |

* cited by examiner

Primary Examiner—Ajit Patel
(74) Attorney, Agent, or Firm—Allen, Dyer, Doppelt, Milbrath & Gilchrist, P.A.

(57) ABSTRACT

A high bit rate digital subscriber line (HDSL) communications scheme employs a serialized multiplexer—demultiplexer protocol, that enables both HDSL channels to be successfully transmitted over an asynchronous, serialized communication link. A service channel supplies control information used by a far end device to extract each HDSL channel from the serialized bit stream. A data channel interface circuit combines a pair of data channel segments of two 784 kbps HDSL channels into a standard 1.544 Mbps T1 serial data stream. The data channel interface circuit contains a register bank which stores embedded operations channel (EOC) information extracted from the two HDSL channels. Auxiliary HDSL signaling information stored in the data channel interface circuit is controllably accessed by a communications control processor for application to an output multiplexer. A framer unit supervises the operation of output multiplexer controllably and injects auxiliary (framing and time alignment) service channel signals to the output multiplexer. The framing structure of the serialized HDSL protocol provides a contiguous sequence of framing bits, HDSL asynchronous channel bits, bit-stuffing majority bits, a stuffing bit, a signaling bit, and 1.544 Mbps T1 payload bits.

17 Claims, 3 Drawing Sheets

SERIALIZED HDSL MULTIPLEXER - DEMULTIPLEXER PROTOCOL

FIELD OF THE INVENTION

The present invention relates in general to digital communication systems, and is particularly directed to a new and improved multiplexer—demultiplexer (mux/demux) protocol and mux/demux communication arrangement therefor for enabling a pair of high bit rate digital subscriber line (HDSL)-formatted data channels and an associated embedded operations channel (EOC) to be transported over a serialized communication link, such as one associated with wireless (e.g., radio, fiber optic) communication equipment.

BACKGROUND OF THE INVENTION

FIG. 1 diagrammatically illustrates a conventional HDSL network architecture for conducting (duplex) communications between a 'control' or head end site 10 and a remote site 20. At the head end site 10, a control terminal or HTU-C 11 is coupled to a first location (e.g., a relatively 'west' end, as viewed in FIG. 1) of a pair of HDSL wireline pairs 33 and 34; similarly, at the remote site 20, a remote terminal or HTU-R 21 is coupled to a relatively 'east' end of the HDSL wireline pairs 33 and 34. The two HDSL wireline pairs carry time synchronized 784 kbps HDSL channels, each of which consists of a 772 kbps data channel and a 12 kbps overhead (embedded operations) channel used for auxiliary communications, such as status monitoring and provisioning. Where the two sites are spaced apart by a relatively large distance, one or more repeater or HRE equipments sites, two of which are shown at 40 and 50, may be installed in each of the wireline pairs.

Because of a number of limitations in using wireline links (including link availability, confined bandwidth, and the need for repeaters for extended distance communications), digital communication service providers have been turning to wireless transmission architectures, such as radio wave and fiber optic links. Unfortunately, the channelized data structures and protocols employed by some digital communication formats, such as HDSL, do not readily lend themselves to schemes which are designed to accept and transmit asynchronous, serialized data signals. As a result, the two wireline links 31 and 32 of the network architecture of FIG. 1 cannot simply be severed in the vicinity of the two sites, as shown by broken lines 35 and 36, and then connected to wireless (e.g., radio) equipments 12 and 22 that are designed to transmit and receive (modulated) serialized and asynchronous digital data.

SUMMARY OF THE INVENTION

In accordance with the present invention, this problem is effectively solved by processing the two HDSL channels in accordance with a prescribed serialized multiplexer—demultiplexer protocol, that enables both HDSL channels to be successfully transmitted over an asynchronous, serialized communication link. The serialization protocol employed by the present invention includes an additional service channel to convey control information used by a far end device to properly extract and reassemble each HDSL channel from the serialized bit stream.

The HDSL-serialized multiplexer portion of the HDSL mux/demux arrangement of the present invention includes a data channel interface circuit, which is operative to interleave a pair of 772 kbps data channel segments of two 784 kbps HDSL channels into a standard 1.544 Mbps T1 serial data stream. This T1 data stream is buffered through a first-in, first-out register or FIFO for application to an output multiplexer. The FIFO provides for clock rate adaptation of the regular T1 data stream with irregular T1 payload possibilities in the protocol. The data channel interface circuit also contains an internal register bank which stores embedded operations channel (EOC) information extracted from the two HDSL channels.

Auxiliary HDSL signaling information stored in the register bank of the data channel interface circuit is controllably accessed by a communications control processor for application to the output multiplexer. HDSL EOC information and service channel information are coupled through associated universal asynchronous receiver/ transmitters or UARTs for application to the output multiplexer. In addition, a processor-controlled framer unit supervises the operation of output multiplexer controllably and injects auxiliary (framing and time alignment) service channel signals to the output multiplexer.

The framing structure of the serialized HDSL protocol of the present invention provides a contiguous sequence of bits, and includes framing bits, HDSL asynchronous channel bits, bit-stuffing majority bits, a stuffing bit, a signaling bit, and 1.544 Mbps T1 payload bits. In order to accommodate the additional signaling bits of the serialized HDSL protocol framing structure of the invention, the multiplexer employs an increased bit rate (on the order of 1.710 Mbps). The framing bits are employed for frame alignment, while the HDSL asynchronous channel bits provide an asynchronous channel for transporting the HDSL EOC bits. The signaling bit provides an auxiliary, independent signaling channel. The bit-stuffing majority bits and the stuffing bit bits supplied by the framer provide bit justification of the T1 data stream. The increased bit rate serial data stream produced by the output multiplexer is coupled to downstream serial communication equipment, such as a fiber optic transmitter or a digital data radio.

At the receive end of the serial link a demultiplexer is coupled to receive the increased bit rate (e.g., 1.710 Mbps) serialized HDSL data stream supplied from upstream serial communication equipment, such as an associated fiber optic transmitter or digital data radio. The demultiplexer is controlled by a frame sync detector and a frame generator. The frame generator uses its knowledge of the protocol framing structure to steer the respective bits of the incoming serialized data stream to a set of output ports. To ensure proper sequencing among the respective output channels, the frame generator defaults the demultiplexer path to the frame sync detector.

Using the bit-stuffing majority bits and stuffing bits for timing alignment, the frame sync detector compares the supposed positions of the framing bits with a prescribed framing pattern, and 'pauses' the operation of the frame generator, until the supposed framing bits match the framing pattern for a predetermined number of consecutive frames. Once the framing pattern has been located, the frame generator is allowed to controllably steer the contents of the incoming serialized data stream to its output ports. One output port is coupled to an associated UART which supplies independent signaling channel bit.

Another output port is coupled to a UART, which supplies HDSL asynchronous channel bits that carry the HDSL EOC information to a microcontroller for storage in associated registers of a T1 demultiplexing ASIC. A further demultiplexer output port supplies the T1 data stream through a FIFO to the T1 demultiplexing interface ASIC. The demultiplexing interface ASIC demultiplexes the two interleaved (784 kbps) HDSL channels and their associated EOC information to individual HDSL channels at a pair of output ports for application to a downstream HTU.

DETAILED DESCRIPTION

Figure 1:
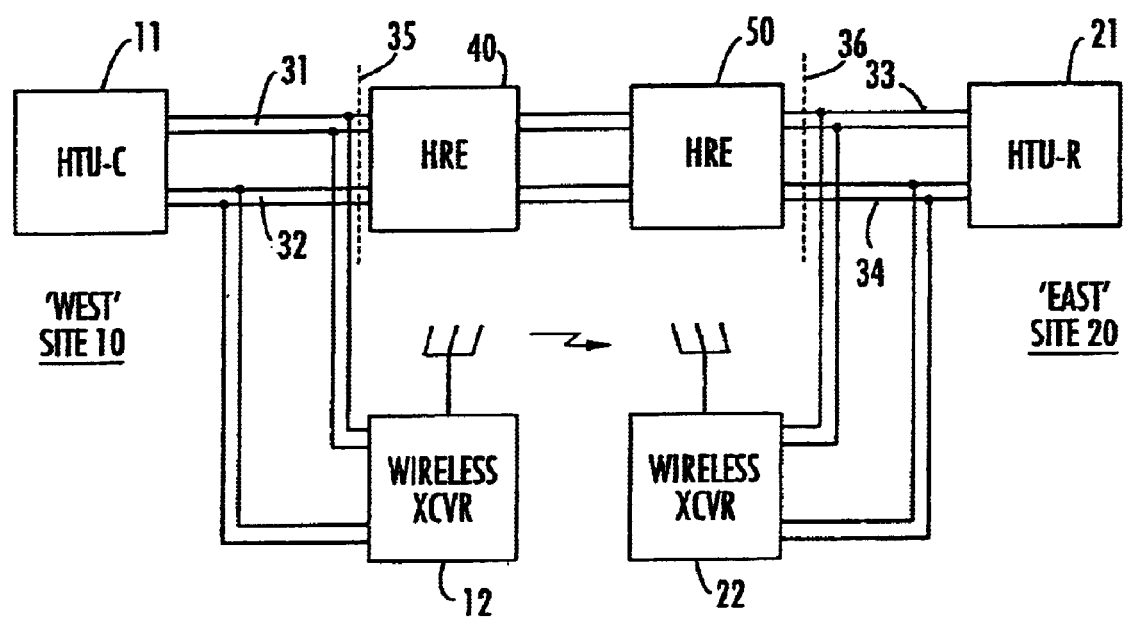
FIG. 1 diagrammatically illustrates a conventional parallel path HDSL network architecture for conducting communications between a control site and a remote site.

Before describing in detail the new and improved HDSL multiplexer—demultiplexer protocol and communication arrangement therefor in accordance with the present invention, it should be observed that the invention resides primarily in prescribed modular arrangements of conventional digital circuits and components. In a practical implementation that facilitates their incorporation into existing printed circuit cards of telecommunication equipment and the like, these modular arrangements may be readily implemented in a field programmable gate array (FPGA), or application specific integrated circuit (ASIC) chip.

Consequently, the configuration of such arrangements of circuits and components and their operation have, for the most part, been illustrated in the drawings by readily understandable digital block diagrams, and associated framing structure diagrams, which show only those specific details that are pertinent to the present invention, so as not to obscure the disclosure with details which will be readily apparent to those skilled in the art having the benefit of the description herein. Thus, the illustrations are primarily intended to show the major components of the invention in convenient functional groupings, whereby the present invention may be more readily understood.

Figure 2:
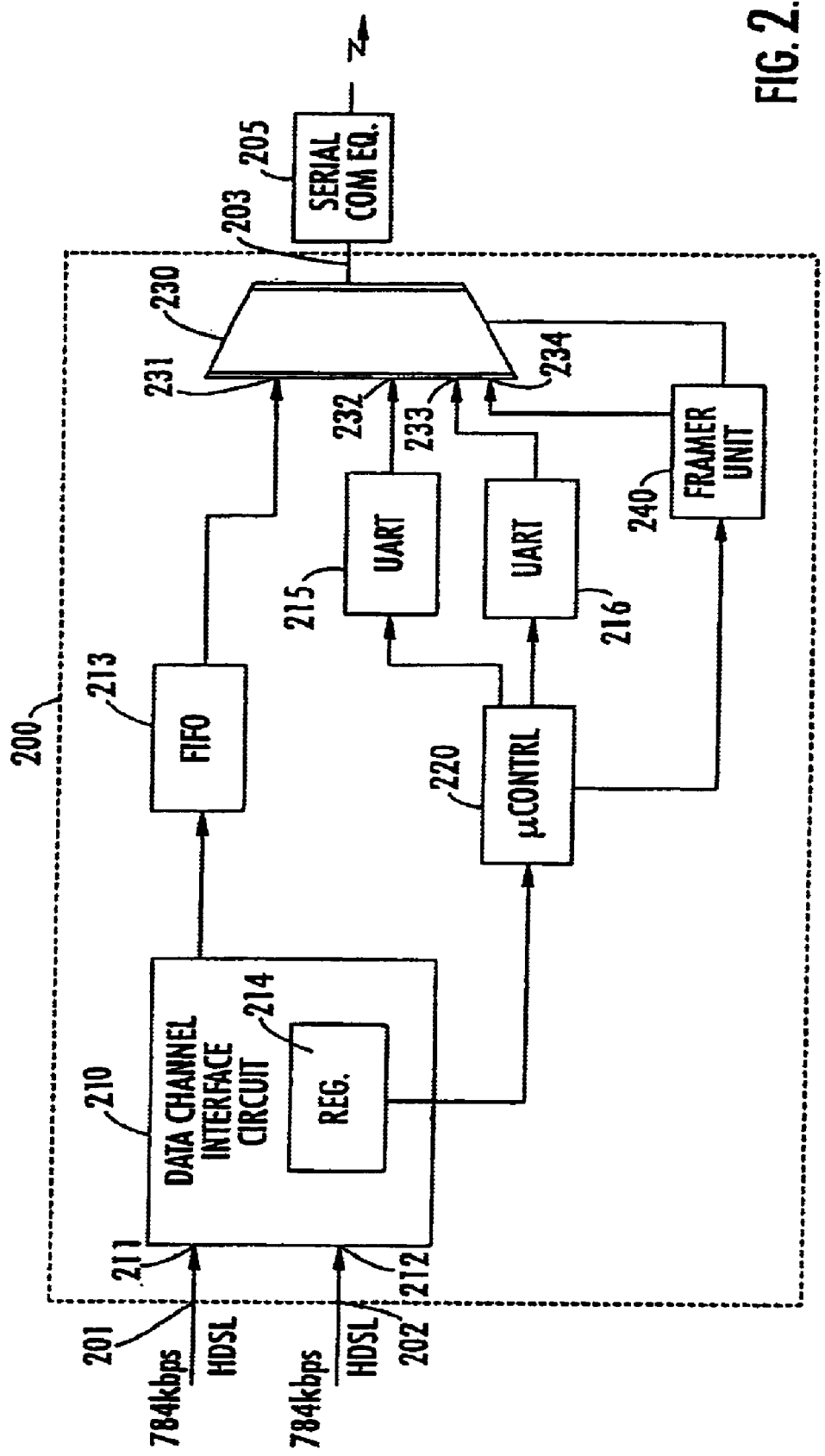
FIG. 2 diagrammatically illustrates the configuration of a respective HDSL-serialized multiplexer of the HDSL mux/demux arrangement of the present invention.

FIG. 2 diagrammatically illustrates the overall configuration of a respective HDSL-serialized multiplexer 200 of the HDSL multiplexer—demultiplexer (mux/demux) arrangement of the present invention. Multiplexer 200 has first and second input ports 201 and 202, to which respective (784 kbps) HDSL channels, such as those transported over the wireline pairs 31 and 32 from the head end HTU-C 11 of the system of FIG. 1, are coupled. It also has an output port 203, from which an increased bit rate (e.g., 1.710 Mbps) serialized HDSL data stream, that contains two (784 kbps) HDSL channels as well as additional auxiliary information channels, to be described, is derived. Output port 203 is adapted to be coupled to downstream serial communication equipment, such as a fiber optic transmitter or a digital data radio, diagrammatically shown at 205.

The two (784 kbps) HDSL channels applied to input ports 201 and 202 are coupled to respective input ports 211 and 212 of a data channel interface circuit 210, such as a conventional T1 multiplexing application specific integrated circuit (ASIC) 210. The T1 multiplexing ASIC 210 is operative to interleave the respective (772 kbps) data channel segments of the two HDSL channels into a standard 1.544 Mbps T1 serial data stream. This T1 data stream is clocked through a first-in, first-out register (FIFO) 213 for application to a first port 231 of an output multiplexer 230. FIFO 213 (as well as a complementary FIFO in the receiver) is supplied with eight bit bytes, which are augmented with start and stop bits, serialized and inserted into the serial HDSL data stream. The FIFOs provide for clock rate adaptation of the regular T1 data stream with irregular T1 payload possibilities in the protocol. The ASIC 210 also contains an internal register bank 214, which stores the (24 kbps) embedded operations channel (EOC) information extracted from the two HDSL channels.

The auxiliary HDSL signaling information stored in the EOC register bank 214 is controllably accessed by a communications control processor 220 for application to output multiplexer 230. HDSL EOC information is coupled through an associated universal asynchronous receiver/transmitter (UART) 215 for application to a second port 232 of output multiplexer 230. Service channel information is coupled through an associated UART 216 for application to a third port 233 of output multiplexer 230. In addition, a processor controlled framer unit 240, which supervises the operation of output multiplexer 230, is operative to controllably inject auxiliary (framing and time alignment) service channel signals to a fourth input port 234 of output multiplexer 230.

Figure 3:
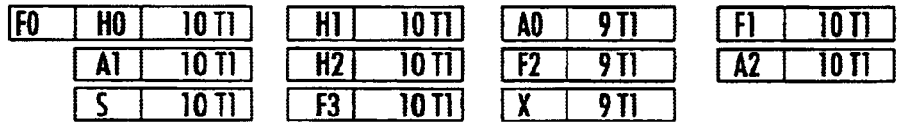
FIG. 3 diagrammatically illustrates the framing structure of the serialized HDSL protocol of the present invention.

The framing structure of the serialized HDSL protocol of the present invention is diagrammatically illustrated FIG. 3 as comprising a contiguous sequence of 119 bits, that includes: four framing bits (F0, F1, F2, F3); three HDSL asynchronous channel bits (H0, H1, H2); three bit-stuffing majority bits (A0, A1, A2); a stuffing bit (S); a signaling bit (X); and 107 (1.544 Mbps) T1 bits. The F bits are employed for frame alignment, while the H bits provide an asynchronous channel for transporting the HDSL EOC bits. As a non-limiting example, a standard one START bit, eight data bits, one STOP bit, no parity structure is employed by EOC UART 215 for transmitting and receiving the HDSL EOC bits. The X bit provides an auxiliary, independent signaling channel supplied through UART 216. The A and S bits supplied by the framer 240 provide for controlled bits stuffing for bit justification of the T1 data stream, as customarily employed in ANSI protocols, such as T1C and T2. The 1.544 Mbps T1 bits carry the T1 data payload.

In order to accommodate the additional signaling bits of the T1 protocol framing structure of FIG. 3, the multiplexer architecture of FIG. 2 may employ an increased bit rate on the order of 1.710 Mbps, as a non-limiting example. For this purpose, a 37.632 MHz (+/−50 ppm) fixed crystal oscillator employed in commercially available HDSL circuitry may be divided down by a factor of 22 to realize a protocol bit rate of 1.710 (54) Mbps (+/−50 ppm), where 54 indicates a repeating, non-terminating sequence of the digital 5 and 4. For E1 applications, the data rate is scaled by a factor of 2.072/1.568, which provides a protocol bit rate of 2.260 (36) Mbps.

Figure 4:
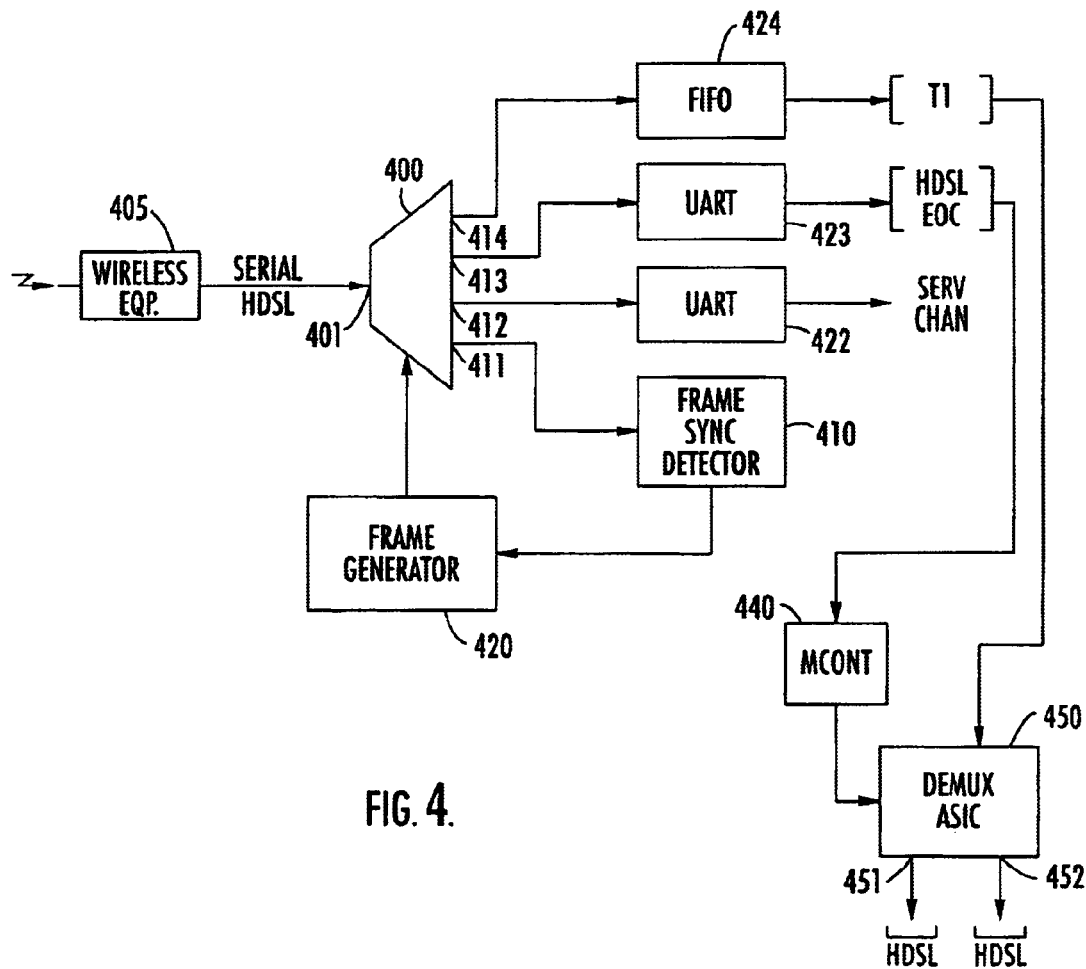
FIG. 4 diagrammatically illustrates the configuration of a serialized HDSL demultiplexer of the HDSL mux/demux arrangement of the present invention.

FIG. 4 diagrammatically illustrates the configuration of a serialized HDSL demultiplexer 400 of the HDSL multiplexer—demultiplexer (mux/demux) arrangement of the present invention. Demultiplexer 400 has a serial input port 401, to which the increased bit rate (e.g., 1.710 Mbps) serialized HDSL data stream supplied from upstream serial communication equipment, such as an associated fiber optic transmitter or digital data radio, diagrammatically shown at 405. The operation of the demultiplexer 400 is controlled by a frame sync detector 410 and a frame generator 420. The frame generator employs its knowledge of the protocol framing structure of FIG. 3 to controllably steer the respective bits of the incoming serialized data stream to its output ports 411–414.

In order to ensure proper sequencing among the respective output channels, the frame generator initially defaults the demultiplexer path to output port 411 through which the frame sync detector 410 monitors the supposed positions of the received framing bits (F). Using the A and S bits for timing alignment, the frame sync detector 410 compares these supposed positions with a prescribed framing pattern, and 'pauses' the steering sequencing operation of the frame generator 420, until the supposed framing bits F match the framing pattern for a predetermined number of consecutive frames. Once the framing pattern has been located, the frame generator 420 is allowed to controllably steer the contents of the incoming serialized data stream to output ports 411–414.

The output port 412 is coupled to an associated UART 422, which supplies channel independent signaling channel X bit. Output port 413 is coupled to a UART 423 which supplies H bits that carry the HDSL EOC information to a microcontroller 440 for storage in associated registers of a T1 demultiplexing ASIC 450. The T1 data stream derived from output port 414 is coupled through a FIFO 424 to the T1 demultiplexing interface ASIC 450. The FIFO 424 is used to extract the serialized bytes from the T1 data stream, which are then buffered in the ASIC 450. The demultiplexing interface ASIC 450 demultiplexes the two interleaved (784 kbps) HDSL channels and their associated EOC information to individual HDSL channels at output ports 451, 452, thereby recovering the original HDSL channels for application to the wireline pairs 31 and 32 and delivery to the remote end HTU-R 21 of the system of FIG. 1.

As will be appreciated from the foregoing description, the inability of conventional channelized data structures and protocols to transport HDSL over an asynchronous, serialized data channel is effectively remedied by an increased bit rate serialized multiplexer—demultiplexer protocol, that includes auxiliary signaling information for both time alignment and for transporting control information to be used by a remote device to extract each HDSL channel from the serialized bit stream. At the receive end of the serial link a demultiplexer uses the auxiliary information to accurately demultiplex the two interleaved (784 kbps) HDSL channels and their associated EOC information to individual HDSL channels.

While I have shown and described an embodiment in accordance with the present invention, it is to be understood that the same is not limited thereto but is susceptible to numerous changes and modifications as known to a person skilled in the art. I therefore do not wish to be limited to the details shown and described herein, but intend to cover all such changes and modifications as are obvious to one of ordinary skill in the art.

What is claimed is:

1. A method of conducting high bit rate digital subscriber line (HDSL) communications between a first site and a second site comprising:

(a) providing a prescribed HDSL-serialized communication protocol, through which a plurality of HDSL channels are combinable into a serialized bit stream for transmission over a serialized communication link to said second site, and which is operative to incorporate, as part of said serialized bit stream, control information that enables said second site to extract and reassemble each HDSL channel from said serialized bit stream, each of said plurality of HDSL channels comprising a fraction of a T1 or E1 channel; and (b) at said first site, multiplexing said plurality of HDSL channels in accordance with said prescribed HDSL-serialized communication protocol, so as to produce said serialized bit stream containing said plurality of HDSL channels and said control information for transmission over said prescribed HDSL-serialized communication link to said second site said multiplexing comprising using a FIFO for clock rate adaptation.

2. A method according to claim 1, further including the step (c) of transmitting said serialized bit stream containing said plurality of HDSL channels and said control information over a wireless communication link to a wireless communication device associated with said second site.

3. A method according to claim 1, wherein said prescribed HDSL-serialized communication protocol is effective to generate a sequence of bits that include framing bits for frame alignment, HDSL asynchronous channel bits for transporting HDSL embedded operations channel bits, bit-stuffing majority bits, a stuffing bit, an auxiliary signaling channel bit, and 1.544 Mbps T1 payload bits.

4. A method according to claim 1, further including the steps of:

(c) transmitting said serialized bit stream containing said plurality of HDSL channels and said control information over said prescribed HDSL-serialized communication link from said first site to said second site;

(d) at said second site, receiving said serialized bit stream containing said plurality of HDSL channels and said control information; and (e) demultiplexing said plurality of HDSL channels from said serialized bit stream.

5. A method according to claim 4, wherein step (e) includes detecting a framing bit pattern in said serialized bit stream, and thereafter controllably deriving said plurality of HDSL channels, and embedded operations channel bits from said serialized bit stream.

6. A method according to claim 5, wherein step (e) includes adjusting a timing attribute of said serialized bit stream in accordance with bit-stuffing majority bits and stuffing bits, so as to locate said framing bit pattern.

7. An arrangement for conducting high bit rate digital subscriber line (HDSL) communications between a first site and a second site comprising:

at said first site, a multiplexer for multiplexing a plurality of HDSL channels in accordance with a prescribed HDSL-serialized communication protocol, which is effective to combine a plurality of HDSL channels into a serialized bit stream for transmission over a serial communication link to said second site, and which is effective to incorporate, as part of said serialized bit stream, control information that enables said second site to extract and reassemble each HDSL channel from said serialized bit stream, each of said plurality of HDSL channels comprising a fraction of a T1 or E1 channel; and at said second site, a demultiplexer, which is coupled to said serial communication link and is operative to demultiplex said plurality of HDSL channels from said serialized bit stream;

said multiplexer and said demultiplexer each comprising a respective FIFO for clock rate adaptation.

8. An arrangement according to claim 7, further including a wireless communication device, coupled to said multiplexer and being operative to transmit said serialized bit stream over a wireless communication link to a wireless communication device associated with said second site.

9. An arrangement according to claim 7, wherein said prescribed HDSL-serialized communication protocol is effective to produce a sequence of bits that include framing bits for frame alignment, HDSL asynchronous channel bits for transporting HDSL embedded operations channel bits, bit-stuffing majority bits, a stuffing bit, an auxiliary signaling channel bit, and 1.544 Mbps T1 payload bits.

10. An arrangement according to claim 7, wherein said demultiplexer includes a framing pattern detector which is operative to detect a framing bit pattern in said serialized bit stream, and an output demultiplexer, which is operative to controllably derive said plurality of HDSL channels, and embedded operations channel bits from said serialized bit stream.

11. An arrangement according to claim 10, wherein said framing pattern detector is operative to adjust a timing attribute of said serialized bit stream in accordance with bit-stuffing majority bits and stuffing bits, so as to locate said framing bit pattern.

12. A communication mechanism for enabling high bit rate digital subscriber line (HDSL) communications to be conducted between a first site and a second site comprising:

an HDSL-serialized communication protocol, which is effective to combine a plurality of HDSL channels having a first bit rate into a serialized bit stream that includes control information that enables said second site to extract and reassemble each HDSL channel from said serialized bit stream, each of said plurality of HDSL channels comprising a fraction of a T1 or E1 channel; and a communication processor, which is operative to multiplex said plurality of HDSL channels in accordance with said prescribed HDSL-serialized communication protocol, into said serialized bit stream having a second bit rate greater than twice that of said first bit rate, and containing said plurality of HDSL channels and said control information for transmission over said prescribed HDSL-serialized communication link to said second site;

said communication processor comprising a FIFO for clock rate adaptation.

13. A communication mechanism according to claim 12, further including a wireless communication device, which is operative to transmit said serialized bit stream containing said plurality of HDSL channels and said control information over a wireless communication link to a wireless communication device associated with said second site.

14. A communication mechanism according to claim 12, wherein said prescribed HDSL-serialized communication protocol is effective to generate a sequence of bits that include framing bits for frame alignment, HDSL asynchronous channel bits for transporting HDSL embedded operations channel bits, bit-stuffing majority bits, a stuffing bit, an auxiliary signaling channel bit, and 1.544 Mbps T1 payload bits.

15. A communication mechanism according to claim 12, wherein said second site includes a demultiplexer, which is operative to demultiplex said plurality of HDSL channels from said serialized bit stream.

16. A communication mechanism according to claim 15, further including a framing bit pattern detector coupled to said demultiplexer and being operative to detect a framing bit pattern in said serialized bit stream, and thereafter cause said demultiplexer to controllably derive said plurality of HDSL channels, and embedded operations channel bits from said serialized bit stream.

17. A communication mechanism according to claim 16, wherein framing bit pattern detector is operative to adjust a timing attribute of said serialized bit stream in accordance with bit-stuffing majority bits and stuffing bits, so as to locate said framing bit pattern.

* * * * *